US012660045B2

(12) United States Patent
    Huang et al.

(10) Patent No.: US 12,660,045 B2
(45) Date of Patent: Jun. 16, 2026

(54) METHOD FOR DISASTER ROAMING

(71) Applicant: MEDIATEK INC., Hsin-Chu (TW)

(72) Inventors: Wan-Ting Huang, Hsinchu City (TW);
              Tsan-Kuang Su, Hsinchu City (TW)

(73) Assignee: MEDIATEK INC., Hsinchu City (TW)

( * ) Notice: Subject to any disclaimer, the term of this
             patent is extended or adjusted under 35
             U.S.C. 154(b) by 310 days.

(21) Appl. No.: 18/381,153

(22) Filed: Oct. 17, 2023

(65) Prior Publication Data

US 2024/0138024 A1      Apr. 25, 2024
    US 2024/0237146 A9      Jul. 11, 2024

Related U.S. Application Data

(60) Provisional application No. 63/418,630, filed on Oct.
     24, 2022.

(51) Int. Cl.
     *H04W 76/50*      (2018.01)
     *H04W 60/04*      (2009.01)
     *H04W 84/04*      (2009.01)
(52) U.S. Cl.
     CPC ........... *H04W 76/50* (2018.02); *H04W 60/04*
              (2013.01); *H04W 84/042* (2013.01)
(58) Field of Classification Search
     CPC .............................. H04W 76/50; H04W 60/04
     USPC ....................................................... 455/404.1
     See application file for complete search history.

(56) References Cited

U.S. PATENT DOCUMENTS

| | | | |
|---|---|---|---|
| 2022/0007276 A1* | 1/2022 | Breuer | H04W 48/06 |
| 2022/0070814 A1* | 3/2022 | Chun | H04W 60/04 |
| 2022/0070815 A1* | 3/2022 | Chun | H04W 8/02 |
| 2022/0116844 A1* | 4/2022 | Qiao | H04B 7/1851 |
| 2022/0167185 A1* | 5/2022 | Kim | H04W 76/19 |
| 2022/0232363 A1* | 7/2022 | Watfa | H04W 4/90 |
| 2022/0253493 A1* | 8/2022 | Hussey | G06F 16/9535 |
| 2023/0043617 A1* | 2/2023 | Vamanan | H04W 8/12 |
| 2023/0095734 A1* | 3/2023 | Agarwal | H04W 8/04 |
| | | | 455/433 |
| 2023/0199568 A1* | 6/2023 | Vesely | H04W 28/24 |
| | | | 455/422.1 |
| 2023/0269689 A1* | 8/2023 | Park | H04W 24/04 |
| | | | 455/432.1 |
| 2023/0362684 A1* | 11/2023 | Kim | H04W 24/10 |
| 2024/0381204 A1* | 11/2024 | Choi | H04W 36/362 |

* cited by examiner

*Primary Examiner* — Maria El-Zoobi
(74) *Attorney, Agent, or Firm* — Winston Hsu

(57) ABSTRACT

A method for disaster roaming includes initiating disaster
roaming search by user equipment (UE) if one of following
conditions occurs: the UE receives System Information
Block (SIB) from a first Public Land Mobile Network
(PLMN), the UE receives a message and/or an information
element from the first PLMN indicating an occurrence of a
disaster or availability of disaster roaming, and the UE
determines out-of-service (OOS) from the first PLMN. The
SIB includes at least one disaster roaming information
element. The method further includes searching by the UE
for a second PLMN to register.

20 Claims, 7 Drawing Sheets

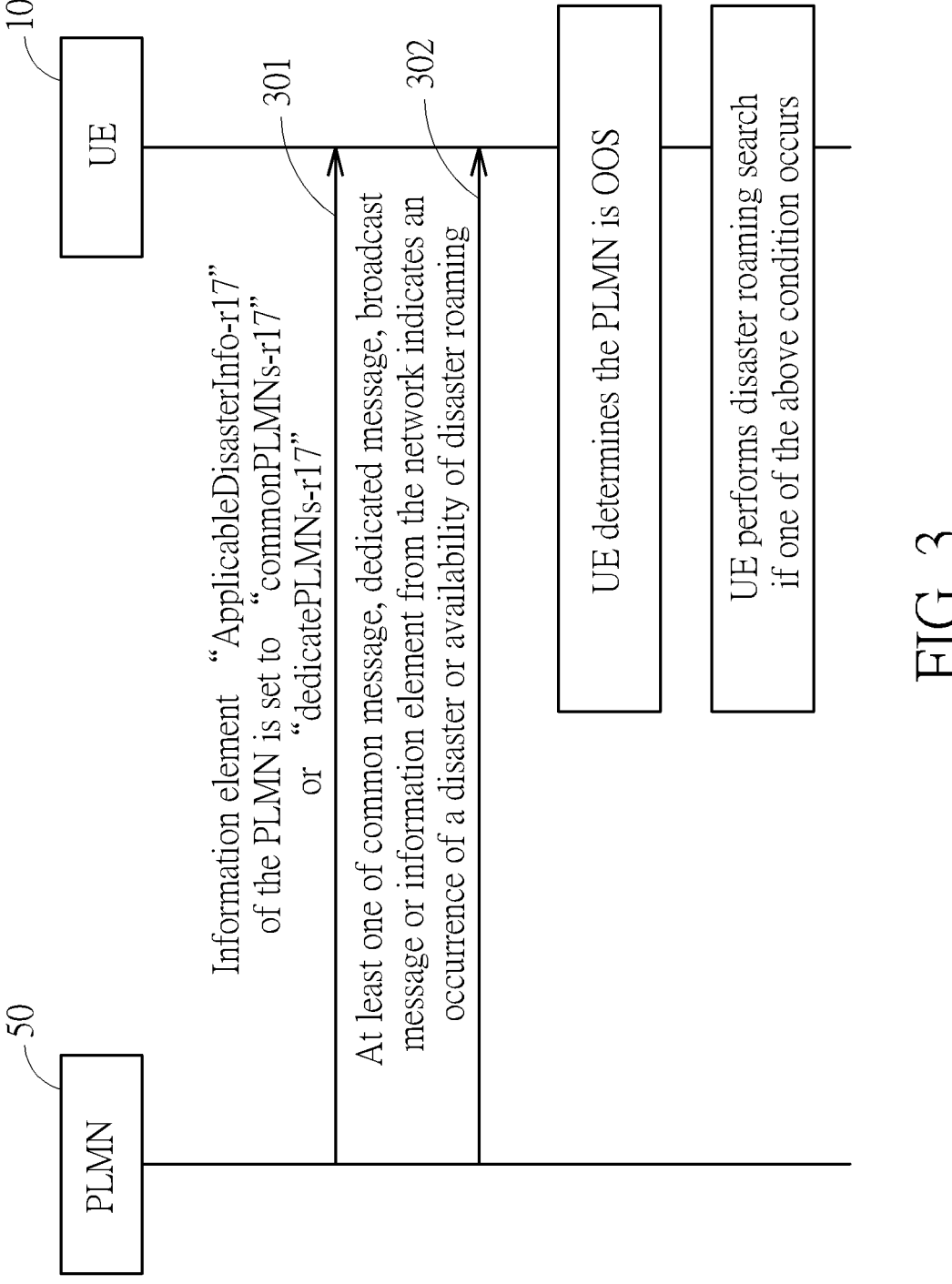

PLMN 50

UE 10

301
Information element "ApplicableDisasterInfo-r17" of the PLMN is set to "commonPLMNs-r17" or "dedicatePLMNs-r17"

302
At least one of common message, dedicated message, broadcast message or information element from the network indicates an occurrence of a disaster or availability of disaster roaming UE determines the PLMN is OOS UE performs disaster roaming search if one of the above condition occurs

FIG. 3

METHOD FOR DISASTER ROAMING

CROSS REFERENCE TO RELATED APPLICATIONS

This application claims the benefit of U.S. Provisional Application No. 63/418,630, filed on Oct. 24, 2022. The content of the application is incorporated herein by reference.

BACKGROUND

Disaster roaming is a service that allows mobile users to access the network of another mobile operator in the event of a disaster or emergency. This can be useful if the user's own mobile operator network is down or congested. Disaster roaming is typically enabled by mobile operators in cooperation with each other and with government agencies. When disaster roaming is enabled, users can automatically connect to the network of another mobile operator without having to do anything manually.

Disaster roaming implements the concept of Minimal Interruption of Service (MINT), which aims to reduce the impact of planned or unplanned outages on the availability and performance of critical systems. This enables mobile network operators to provide continuous connectivity to their customers in the event of a network failure or a natural disaster. Disaster roaming allows operators to automatically switch to alternative network resources, such as satellites or neighboring networks, when their own network is unavailable. It also allows users to use other operators' networks when their own operator's network is brought down by a disaster. These features ensure that users can stay connected and access vital information and services during emergencies.

As contemplated by the 3GPP, user equipment (UE) may connect to a public land mobile network (PLMN) for a variety of connectivity services. In some instances, when connecting to a selected PLMN, UE registration with the selected PLMN may fail. For example, UE may be a subscriber of a PLMN and attempt to register with the selected PLMN, but the registration may fail due to a disaster condition. The UE may determine a disaster condition on the selected PLMN, for example, when the UE does not detect any cell of the selected PLMN and the UE finds an alternative PLMN indicating that it is offering disaster roaming.

In disaster roaming, the UE may attempt to register with an alternative PLMN by performing a PLMN search and selecting an alternative PLMN depending on defined PLMN priority information of the UE. Due to the disaster condition, the UE may select an alternative PLMN from a Visited PLMN (VPLMN).

However when the disaster area only covers the core network but not the base stations, i.e., the base stations are still working. The UE may not be aware of the situation; it may still be connected to the base station but lose its normal mobile network service capability due to damage on the core network. The UE may suffer more service unavailable time in the process of selecting available cells in the Registered PLMN (RPLMN), which cannot provide the normal mobile network service at the moment. Eventually, the UE may need to disconnect from the service provided by the RPLMN and enter the recovery search mode.

SUMMARY

An embodiment provides a method for disaster roaming. The method includes initiating disaster roaming search by user equipment (UE) if one of following conditions occurs: the UE receives System Information Block (SIB) from a first Public Land Mobile Network (PLMN), the UE receives a message and/or an information element from the first PLMN indicating an occurrence of a disaster or availability of disaster roaming, and the UE determines out-of-service (OOS) from the first PLMN. The SIB includes at least one disaster roaming information element. The method further includes searching by the UE for a second PLMN to register.

Another embodiment provides a method of for disaster roaming. The method includes adjusting a cell selection criterion of user equipment (UE) when the UE is on a disaster roaming target cell of a Public Land Mobile Network (PLMN), and assigning a camp threshold in the cell selection criterion.

An embodiment provides user equipment (UE). The UE includes an antenna and a processor coupled to the antenna. The processor is used to perform disaster roaming search if one of a following condition occurs: the UE receives System Information Block (SIB) from a first Public Land Mobile Network (PLMN), the UE receives a message and/or an information element from the first PLMN indicating an occurrence of a disaster or availability of disaster roaming, and the UE determines out-of-service (OOS) from the first PLMN. The SIB includes a disaster roaming information element. The processor is further used to search for a second Public Land Mobile Network (PLMN) to register.

Another embodiment provides user equipment (UE). The user equipment includes an antenna and a processor coupled to the antenna. The processor is used to adjust a cell selection criterion of UE when the UE is on a disaster roaming target cell of a Public Land Mobile Network (PLMN), and assign a camp threshold in the cell selection criterion.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 illustrates a session flow diagram corresponding to the method in FIG. 2 for disaster roaming.

DETAILED DESCRIPTION

Figure 1:
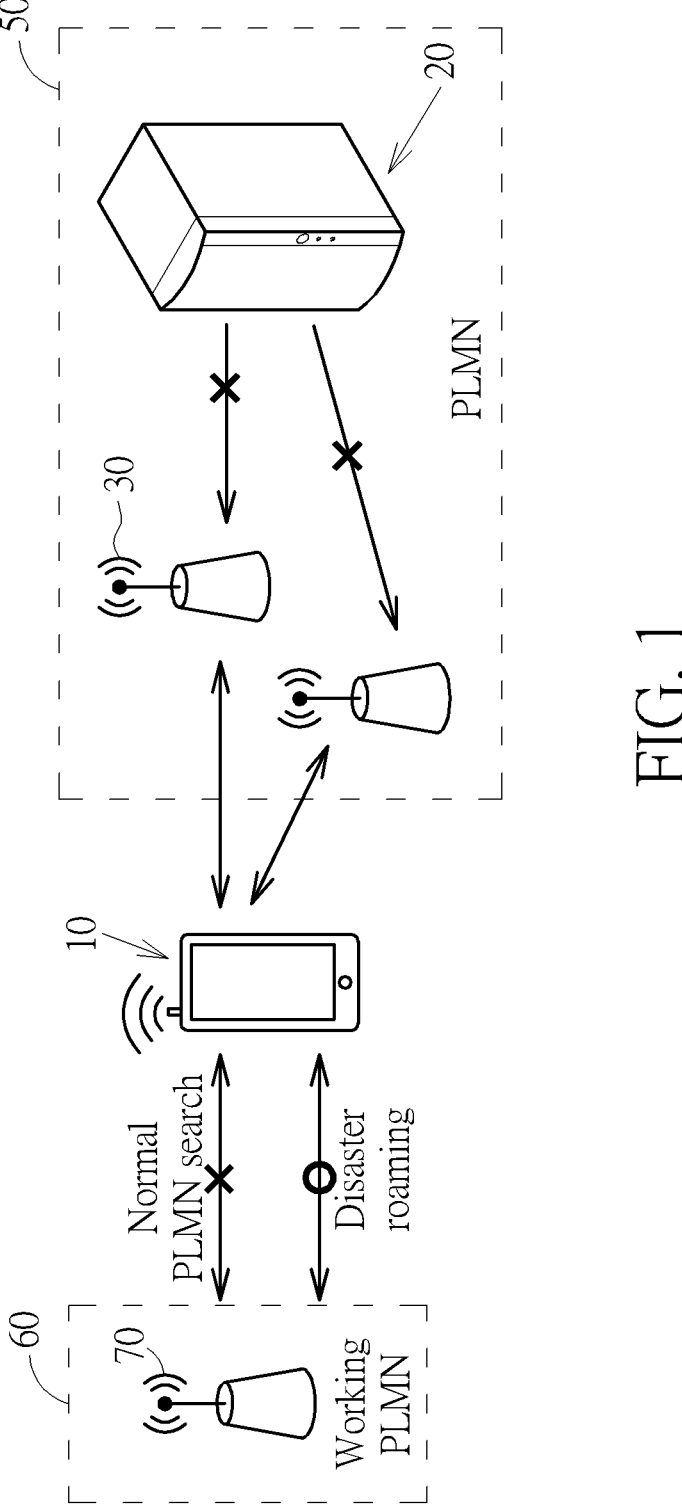
FIG. 1 illustrates a scenario of disaster roaming of an embodiment.

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi).

The following technique, apparatus and system can be applied to various wireless multiple access systems. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a system, and a Single Frequency Division Multiple Access (SC-FDMA) system. Carrier Frequency Division Multiple Access) systems, and MC-FDMA (Multi-Carrier Frequency Division Multiple Access) systems. CDMA may be implemented through a radio technology such as Universal Terrestrial Radio Access (UTRA) or CDMA2000. TDMA may be implemented through a radio technology such as Global System for Mobile communications (GSM), General Packet Radio Service (GPRS), or Enhanced Data rates for GSM Evolution (EDGE). OFDMA may be implemented through a wireless technology such as Institute of Electrical and Electronics Engineers (IEEE) 802.11 (Wi-Fi), IEEE 802.16 (WiMAX), IEEE 802.20, or Evolved UTRA (E-UTRA). UTRA is part of the Universal Mobile Telecommunications System (UMTS). 3rd Generation Partnership Project (3GPP) Long-Term Evolution (LTE) is a part of Evolved UMTS (E-UMTS) using E-UTRA. 3GPP LTE uses OFDMA in downlink (DL) and SC-FDMA in uplink (UL). Evolution of 3GPP LTE includes LTE-A (Advanced), LTE-A Pro, and/or 5G New Radio (NR).

For convenience of description, the implementation of the present specification is mainly described in relation to a 3GPP-based wireless communication system. However, the technical characteristics of the present specification are not limited thereto. For example, the following detailed description is provided based on a mobile communication system corresponding to the 3GPP-based wireless communication system, but aspects of the present specification that are not limited to the 3GPP-based wireless communication system may be applied to other wireless communication systems.

For terms and techniques not specifically described, reference may be made to wireless communication standard documents (e.g., 3GPP Specifications) issued before this specification.

In this specification, technical features that are individually described within one drawing may be implemented individually or simultaneously.

Although not limited thereto, the various descriptions, functions, procedures, suggestions, methods, and/or operation flowcharts disclosed herein may be applied to various fields requiring wireless communication and/or connection (e.g., Wi-Fi, 5G) between devices.

As described by the 3GPP, different wireless communication systems standards and protocols can use various radio access networks (RANs) for communicating between a base station of the RAN (which may sometimes be referred to generally as a RAN node, a network node, or simply a node) and a wireless communication device known as user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATS) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

The RAN can include one or more access nodes, which may be referred to as base station, NodeB, evolved NodeB (eNB), next Generation NodeB (gNB), RAN nodes, controllers, transmission reception points (TRPs), and so forth, and can include ground stations (e.g., terrestrial access points) or satellite stations providing signal coverage within a geographic area (e.g., a cell). The RAN may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

A base station used by a RAN may correspond to that RAN. An example of an E-UTRAN base station is an Evolved Universal Terrestrial Radio Access Network (E-UTRAN) Node B (also referred to as evolved Node B, enhanced Node B, eNodeB, or eNB). Another example of an NG-RAN base station is a next generation Node B (also referred to as a gNodeB or gNB).

A RAN provides its communication services with external entities through its connection to a core network (CN). For example, E-UTRAN may utilize an Evolved Packet Core (EPC), while NG-RAN may utilize a 5G Core Network (5GC).

A Public Land Mobile Network (PLMN) as used in this disclosure refers to a wireless communication system that operates in a specific geographic area and provides voice and data services to UE. A PLMN contains several components, such as base stations and core network. It can be owned and operated by a single network operator, or it can be shared by multiple operators through roaming agreements. A PLMN can also interconnect with other networks, such as the public switched telephone network (PSTN), the internet, or other PLMNs. Also PLMN is identified by a combination of MCC (Mobile Country Code) and MNC (Mobile Network Code), which makes it unique globally. There different types of PLMNs specified by the 3GPP.

Registered PLMN (RPLMN) is the PLMN that the UE is currently registered to. Home PLMN (HPLMN) is the PLMN where the subscriber's profile is configured and stored in the HLR (Home Location Register). HPLMN is derived from the IMSI (International Mobile Subscriber Identity) of the SIM card and does not change while roaming. Visited PLMN (VPLMN) is the PLMN where the subscriber is currently attached to via the access network. VPLMN is derived from the roaming information and may change depending on the location and availability of the mobile operator.

FIG. 1 illustrates a scenario of disaster roaming of an embodiment. When a disaster (e.g., major explosion, earthquake, wildfire, hurricane, etc.) damages a core network 20 (i.e., mobile communication infrastructure and facilities), the mobile network service provided by the core network 20, and thus PLMN 50, may be interrupted and become unavailable. However, the base station 30, which connects to the core network 20, may not be damaged by the disaster due to its remote distance from the disaster area. For this scenario, user equipment (UE) 10 may still be connected to the base downlink through the DLSCH (downlink shared channel). SIBs contain information about the networks and the features they support. The list of SIB has been growing over time as more features have been added.

The following shows an exemplary content of SIB15:

```
: Carries configurations of disaster roaming information.
SIB15-r17 ::= SEQUENCE {
    commonPLMNsWithDisasterCondition-r17    SEQUENCE (SIZE (1..maxPLMN))
                OF PLMN-Identity OPTIONAL, -- Need R
    applicableDisasterInfoList-r17        SEQUENCE (SIZE (1..maxPLMN))
                OF ApplicableDisasterInfo-r17 OPTIONAL, -- Need R
    lateNonCriticalExtension        OCTET STRING OPTIONAL,
    ...
}
ApplicableDisasterInfo-r17 ::= CHOICE {
    noDisasterRoaming-r17   NULL,
    oneBitApproach-r17      NULL, -- The semantics for this approach is pending CT1
progress
    commonPLMNs-r17      NULL,
    dedicatedPLMNs-r17      SEQUENCE (SIZE (1..maxPLMN)) OF PLMN-Identity
}.
``` station 30 of PLMN 50. Yet, the PLMN 50 may not be able to provide mobile network service to the UE 10. UE 10 may not be aware of the real situation, and it simply loses its normal mobile network service due to damage of the core network 20. The UE 10 may suffer more service unavailable time in the process of selecting available cells of the PLMN 50, which cannot provide mobile network service at the moment. Because the UE 10 has not entered the disaster roaming search, it may not connect to the base station 70 of the working PLMN 60 (i.e., the PLMN that functions to provide mobile network service normally). In some embodiments, the PLMN 50 may be a RPLMN, and the PLMN 60 may be a VPLMN.

To avoid the above described situation and achieve shortened service unavailable time, a method 200 for disaster roaming is disclosed below.

Figure 2:
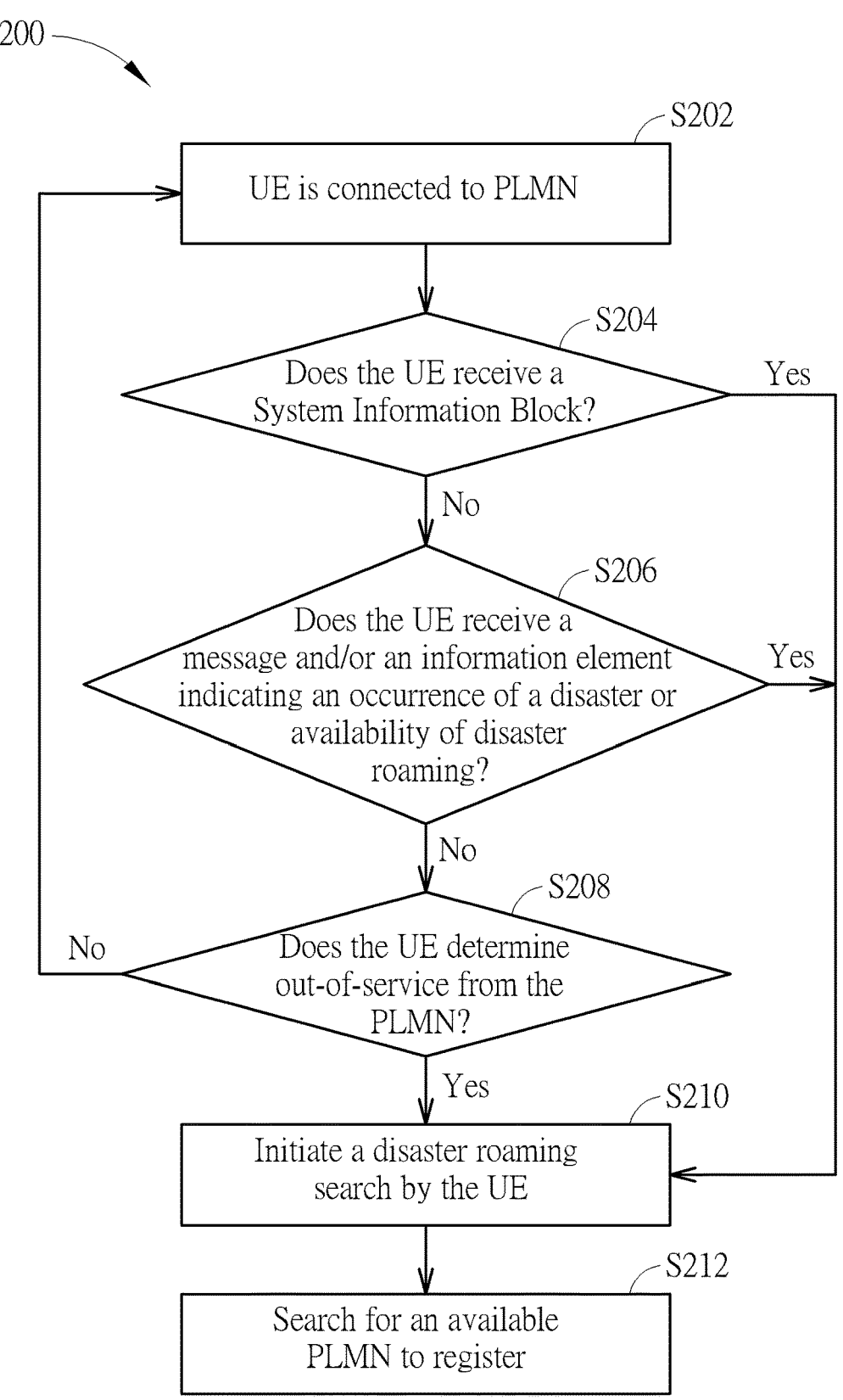
FIG. 2 illustrates a flowchart of the method for disaster roaming of an embodiment.

FIG. 2 is a flowchart of the method 200 for disaster roaming of an embodiment. The method 200 may include the following steps:

S202: UE 10 is connected to PLMN 50;

S204: Does the UE 10 receive a System Information Block (SIB)? If so, proceed to S210; if not, proceed to S206;

S206: Does the UE 10 receive a message and/or an information element indicating an occurrence of a disaster or availability of disaster roaming? If so, proceed to S210; if not, proceed to S208;

S208: Does the UE 10 determine out-of-service (OOS) from the PLMN 50? If so, proceed to S210; if not, back to S202;

S210: Initiate a disaster roaming search by the UE 10; and

S212: Search for an available PLMN to register.

In step S204, the System Information Block (SIB) may be SIB15 as specified in the 3GPP Specification. SIB may include one or more disaster roaming information elements. More specifically, the disaster roaming information element may include the parameter "ApplicableDisasterInfo-r17" of the PLMN 50 being set to "commonPLMNs-r17" or "dedicatePLMNs-r17". When the UE 10 receives such information element, it may break from the current connection to the PLMN 50 and initiate the disaster roaming search.

It should be noted that SIBs provide common information to all UE in the mobile network. SIBs are transmitted in the In step S206, the message and/or the information element indicating an occurrence of a disaster or availability of disaster roaming can be sent from an Earthquake and Tsunami Warning System (ETWS) or the Commercial Mobile Alert Service (CMAS). An Earthquake and Tsunami Warning System (ETWS) is a network of sensors and communication devices that can detect seismic activity and alert coastal populations of the risk of a tsunami. The system is often constructed with seismometers, tide gauges, buoys, satellites, and radio transmitters that can measure ground motion, water level, wave height, and speed. The data from these sensors is transmitted to a central processing center, where algorithms analyze the information and issue warnings to the authorities and the public. The system can also provide guidance on evacuation routes, safe zones, and emergency procedures. A mobile alert can be triggered by an ETWS with the message and/or the information element indicating an occurrence of a disaster or availability of disaster roaming.

On the other hand, Commercial Mobile Alert Service (CMAS) is a system that enables authorized government agencies to send emergency alerts to mobile devices in areas affected by natural or man-made disasters. CMAS alerts are designed to provide timely and accurate information to the public, such as evacuation orders, shelter locations, or imminent threats. CMAS alerts are transmitted by wireless carriers using a special protocol that ensures high priority and reliability. Thus, the message and/or the information element indicating an occurrence of a disaster or availability of disaster roaming can be sent from CMAS. However, the present invention is not limited to ETWS and CMAS. Other systems and techniques for broadcasting message and/or the information element are also included within the scope of this disclosure.

In step S208, the UE 10 may determine out-of-service (OOS) from the PLMN 50 if the cell selection criterion S of the UE 10 is not fulfilled for a certain amount of time (e.g., 10 seconds).

It should be noted that out-of-service (OOS) from the PLMN as used in this disclosure specifically means cell OOS caused by damages in the core network. The characteristic of cell OOS caused by damages in the core network may include the following:

(1) Cellular signal satisfy "camp on" condition (e.g., cell selection criterion S), but UE cannot receive normal cellular service (e.g., UE cannot register); or (2) Usable cellular signal suddenly becomes undetectable by UE; and (3) The above condition occurs to multiple cells.

When one of the above described conditions in steps S204 to S206 occurs, the UE 10 may perform the procedure for disaster roaming search for another PLMN as specified in the 3GPP specification without further delay.

FIG. 3 illustrates a session flow diagram corresponding to the method 200 for disaster roaming. If one of the information sessions 301 and 302 is received by the UE 10, the UE 10 may perform the disaster roaming search procedure. Otherwise, if the UE 10 determines the PLMN 50 is out-of-service, the UE 10 may also perform the disaster roaming search procedure. In other words, the UE 10 may perform the disaster roaming search procedure if the information element "ApplicableDisasterInfo-r17" of the PLMN 50 being set to "commonPLMNs-r17" or "dedicatePLMNs-r17" is received by the UE 10. Furthermore, the UE 10 may perform the disaster roaming search procedure if at least one of a common message, a dedicated message, a broadcast message and information element indicating an occurrence of a disaster or availability of disaster roaming is received by the UE 10. The detailed method has been described in the previous paragraphs and is not repeated herein for brevity.

Figure 4:
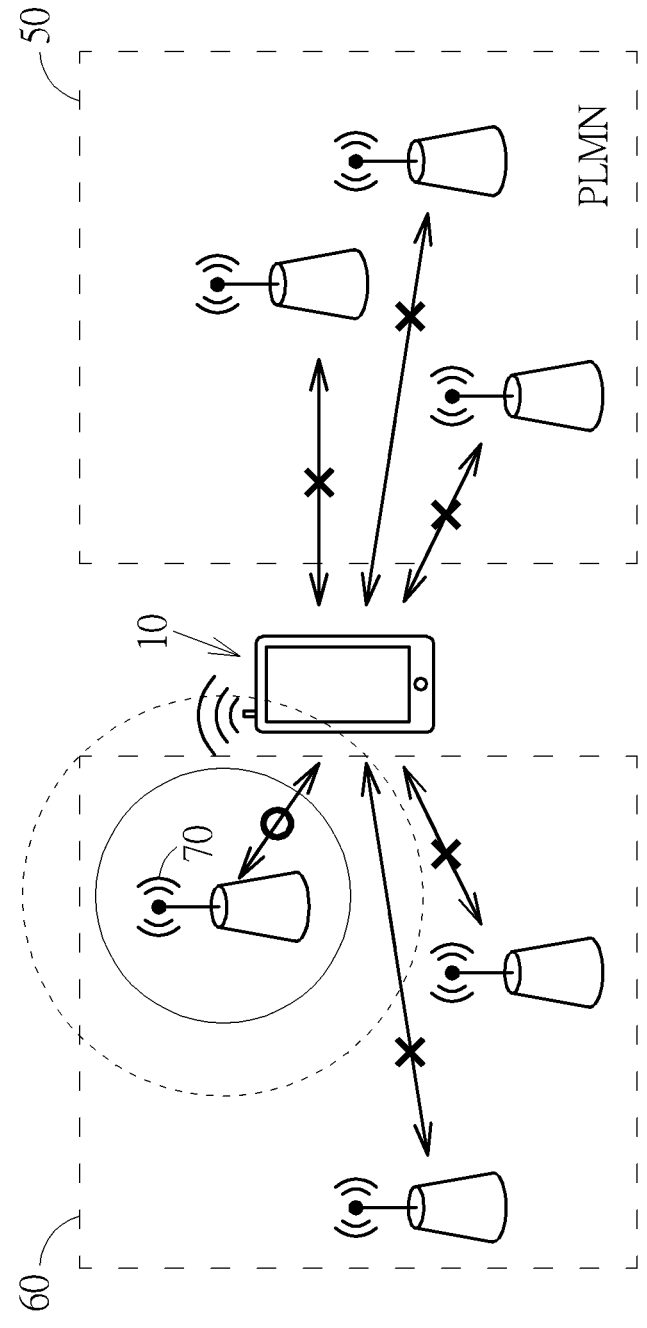
FIG. 4 illustrates a scenario of disaster roaming of an embodiment.

FIG. 4 illustrates a scenario of disaster roaming of an embodiment. During a disaster, because the infrastructure may be damaged or even destroyed, there may be less base stations compared to normal circumstances. When the UE 10 initiates the disaster roaming search, the base station 70 of the working PLMN 60 may be some distance away from the UE 10. This causes the UE 10 to detect lower signal strength from the disaster roaming target cell (i.e., the signal coverage of the base station 70). Thus, the cell selection criterion (e.g., cell selection criterion S) of the UE 10 may need to be adjusted in order for the UE 10 to camp on the target cell.

Under normal circumstance, the cell selection criterion is fulfilled when:

$$Srxlev>0\ \&\&\ Squal>0$$

where:

$$Srxlev=Q_{rxlevmeas}-(Q_{rxlevmin}+Q_{rxlevminoffset})-P_{compensation}-Qoffset_{temp}$$

$$Squal=Q_{qualmeas}-(Q_{qualmin}+Q_{qualminoffset})-Qoffset\_temp$$

The descriptions of the above parameters are listed in Table 1 below.

TABLE 1

| Srxlev: | Cell selection RX level value (dB). |
|---|---|
| Squal: | Cell quality value (dB). |
| $Q_{rxlevmeas}$: | Measured cell RX level value (RSRP). |
| $Q_{rxlevmin}$: | Minimum required RX level in the cell. |
| $Q_{rxlevminoffset}$: | Offset to the signaled $Q_{rxlevmin}$ taken into account in a Srxlev evaluation as a result of a periodic search for a higher priority PLMN while camped normally in a VPLMN. |
| $P_{compensation}$: | For FR1, if the UE supports the additionalPmax in the NR-NSPmaxList, if present, in SIB1, SIB2 and SIB4: max($P_{EMAX1}$ − $P_{PowerClass}$, 0) − (min($P_{EMAX2}$, $P_{PowerClass}$) − min($P_{EMAX1}$, $P_{PowerClass}$)) (dB); else: max($P_{EMAX1}$ − $P_{PowerClass}$, 0) (dB). For FR2, $P_{compensation}$ is set to 0 (dB). |
| $Qoffset_{temp}$: | Offset temporarily applied to the cell. |
| $Q_{qualmeas}$: | Measured cell quality value (RSRQ). |

TABLE 1-continued

| $Q_{qualmin}$: | Minimum required quality level in the cell. |
|---|---|
| $Q_{qualminoffset}$: | Offset to the signaled $Q_{qualmin}$ taken into account in a Squal evaluation as a result of a periodic search for a higher priority PLMN while camped normally in the VPLMN. |
| $P_{EMAX1}$, $P_{EMAX2}$: | Maximum TX power level of UE may use when transmitting on the uplink in the cell (dBm) defined as $P_{EMAX}$ in TS 38.101. |
| $P_{PowerClass}$: | Maximum RF output power of the UE (dBm) according to the UE power class as defined in TS 38.101-1. |

It should be noted that FR1 (Frequency Range 1) covers sub-6 GHz frequency bands and FR2 (Frequency Range 2) covers millimeter wave frequency bands. A more detailed description of the above parameters can be found in 3GPP TS 38.304 version 15.6.0 Release 15.

In the scenario illustrated in FIG. 4, the cell selection criterion can be adjusted to:

$$(Srxlev>0\&\&Squal>0)\|(Q_{rxlevmeas}\geq camp\ threshold)$$
$$camp\ threshold>(Q_{rxlevmin}+Q_{rxlevminoffset})+P_{compensation}+Qoffset_{temp}$$

By adjusting or tuning the cell selection criterion, the camp threshold is lowered and the UE 10 may be camped on the target cell (i.e., disaster roaming target cell) with lower detected signal strength, e.g., from −450 qdBm down to −500 qdBm. (Note that dBm=qdBm/4.)

Figure 5:
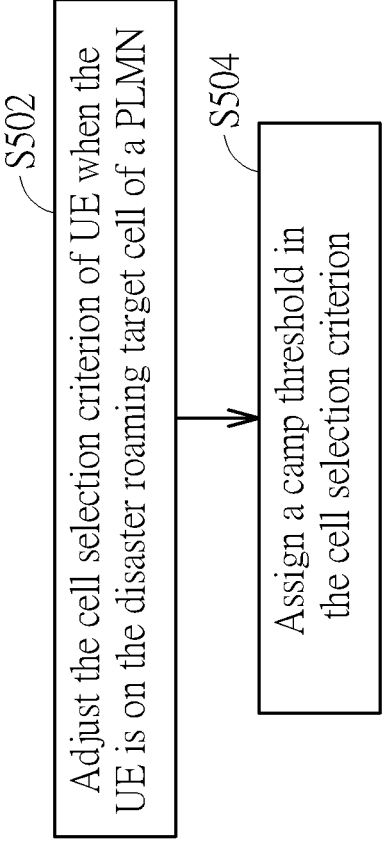
FIG. 5 illustrates a flowchart of another method for disaster roaming of an embodiment.

FIG. 5 is a flowchart of a method 500 for disaster roaming of an embodiment. The method 500 includes the following steps:

S502: Adjust the cell selection criterion of UE 10 when the UE is on the disaster roaming target cell of a PLMN 60; and S504: Assign a camp threshold in the cell selection criterion.

The disaster roaming target cell can be the signal coverage of the base station 70. The cell selection criterion, the camp threshold and other detailed method have been described in the previous paragraphs, and the description is not repeated herein for brevity.

Figure 6:
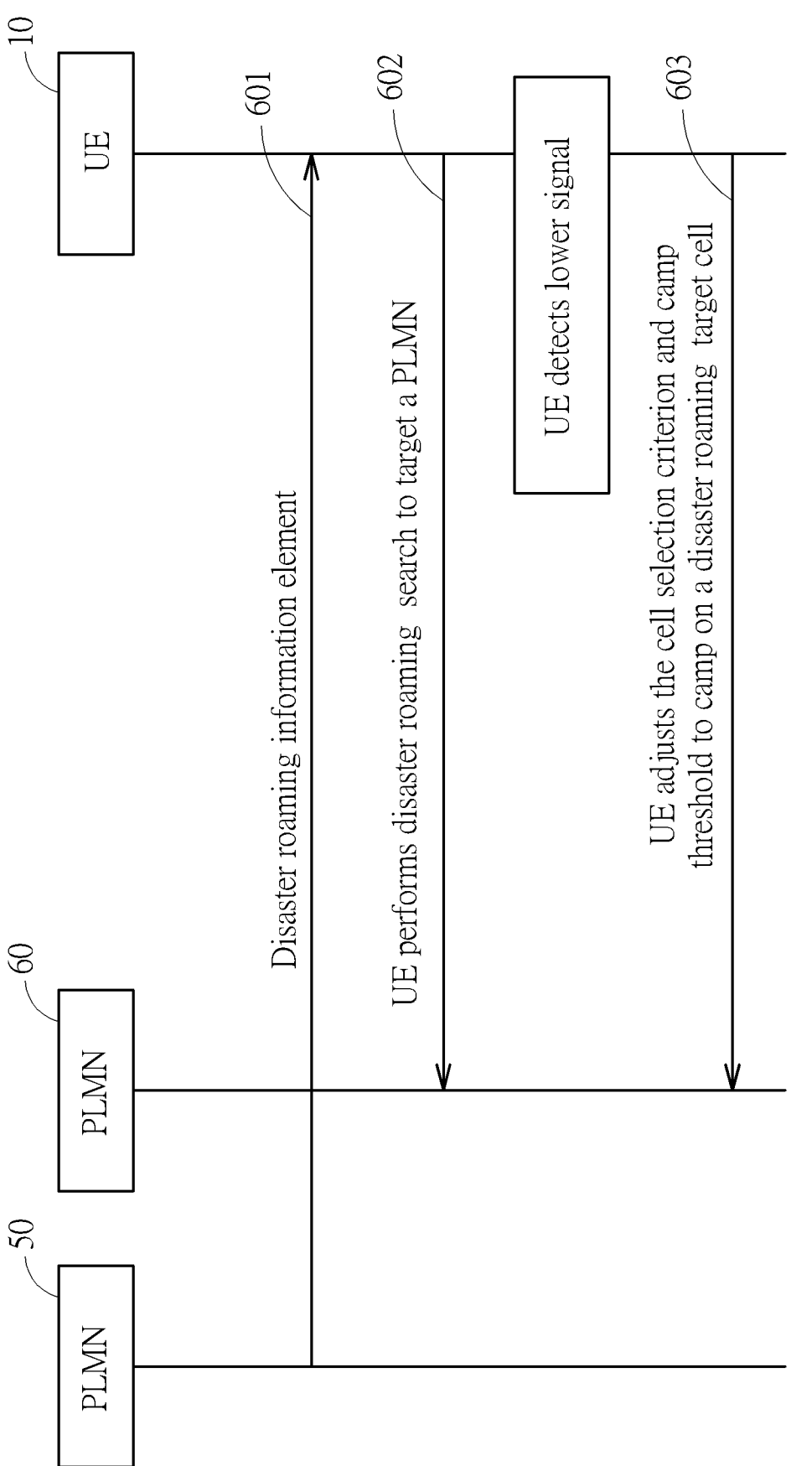
FIG. 6 illustrates a session flow diagram corresponding to the method in FIG. 5 for disaster roaming.

FIG. 6 illustrates a session flow diagram corresponding to the method 500 for disaster roaming. Initially, the UE 10 is in connection with PLMN 50. When a disaster occurs, the PLMN 50 may send an information session 601 with disaster roaming information element including the parameter "ApplicableDisasterInfo-r17" of the PLMN 50 being set to "commonPLMNs-r17" or "dedicatePLMNs-r17". When the UE 10 receives such information element, it may break from the current connection to the PLMN 50 and perform the disaster roaming search (information session 602) to target a working PLMN (e.g., PLMN 60). The UE 10 may detect a target cell from PLMN 60 (i.e., signal coverage from base station 70 in FIG. 4), of which the target cell (i.e., disaster roaming target cell) may have lower signal strength due to its distance and other factors. In order to properly be camped on the target cell, the UE 10 may need to adjust its own cell selection criterion and camp threshold (information session 603).

The cell selection criterion can be adjusted to:

$$(Srxlev>0\&\&Squal>0)\|(Q_{rxlevmeas}\geq camp\ threshold)$$
$$camp\ threshold>(Q_{rxlevmin}+Q_{rxlevminoffset})+P_{compensation}+Qoffset_{temp}$$

The descriptions of the parameters are listed in Table 1 above, and will not be repeated herein.

Figure 7:
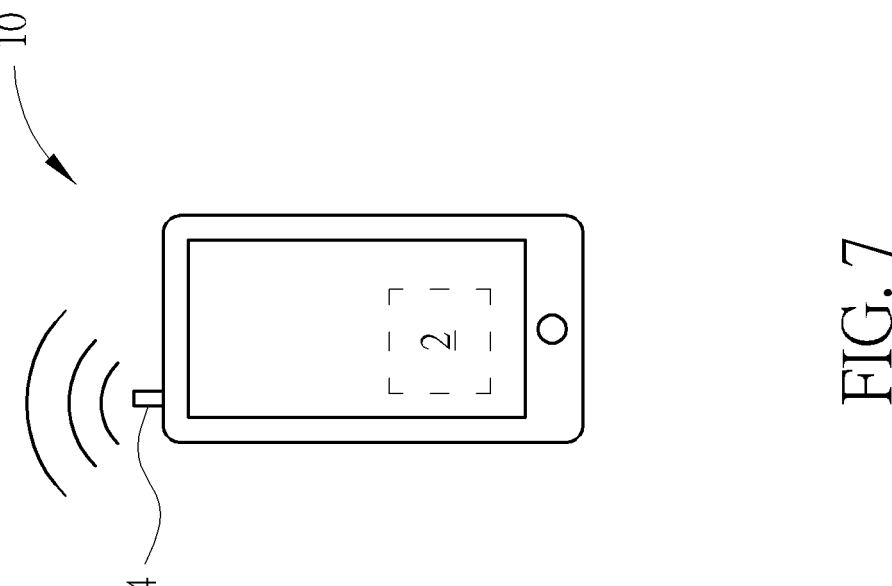
FIG. 7 illustrates the user equipment in FIG. 1 of an embodiment.

FIG. 7 is a diagram illustrating the user equipment 10 of an embodiment. The UE 10 includes an antenna 4 and a processor 2 coupled to the antenna 4. The processor 2 is used to perform disaster roaming search by the user equipment (UE) 10 if one of a following condition occurs: the UE 10 receives System Information Block (SIB) from a Public Land Mobile Network (PLMN) 50, the UE 10 receives a message and/or an information element from the PLMN 50 indicating an occurrence of a disaster or availability of disaster roaming, and the UE 10 determines out-of-service (OOS) from the PLMN 50. The SIB includes a disaster roaming information element. Also, the processor 2 is used to search for a second PLMN to register. The processor 2 is also used to adjust a cell selection criterion of UE 10 when the UE 10 is on a disaster roaming target cell of a second PLMN, and the processor 2 is also used to assign a camp threshold in the cell selection criterion. The antenna 4 may be any device having elements coupled to a receiver or a transmitter to interface between radio waves propagating through space and electric currents moving in conductors.

The UE as described in this disclosure may include a device with radio communication capabilities. For example, the UE may include a smartphone (e.g., handheld touch-screen mobile computing devices connectable to one or more cellular networks). The UE may also include any mobile or non-mobile computing device, such as Personal Data Assistants (PDAs), pagers, laptop computers, desktop computers, wireless handsets, or any computing device that has a wireless communications interface.

The UE may also be referred to as a client, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE may include IoT UE, which can include a network access layer designed for low-power IoT applications utilizing short-lived UE connections. IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UE, which may include uniquely identifiable embedded computing devices (within the Internet infrastructure). The IoT UE may execute background applications (e.g., keep-alive messages, status updates, etc.) to facilitate the connections of the IoT network.

The UE as described in this disclosure may be configured to connect or communicatively couple with the Radio Access Network (RAN) through a radio interface, which may be a physical communication interface or layer config-ured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE and the RAN may use a Uu interface (e.g., an LTE-Uu interface) to exchange control plane data via a protocol stack comprising a PHY layer, an MAC layer, an RLC layer, a PDCP layer, and an RRC layer. A DL transmission may be from the RAN to the UE and a UL transmission may be from the UE to the RAN. The UE may further use a sidelink to communicate directly with another UE (not shown) for D2D, P2P, and/or ProSe communication. For example, a ProSe interface may include one or more logical channels, including but not limited to a Physical Sidelink Control Channel (PSCCH), a Physical Sidelink Shared Channel (PSSCH), a Physical Sidelink Discovery Channel (PSDCH), and a Physical Side-link Broadcast Channel (PSBCH).

The terms "coupled," "connected", "connecting," "elec-trically connected," etc., are used interchangeably herein to generally refer to the condition of being electrically/elec-tronically connected. Similarly, a first entity is considered to be in "communication" with a second entity (or entities) when the first entity electrically sends and/or receives (whether through wire or wireless means) information sig-nals (whether containing voice information or non-voice data/control information) to/from the second entity regard-less of the type (analog or digital) of those signals. It is further noted that various figures (including component diagrams) shown and discussed herein are for illustrative purpose only, and are not drawn to scale.

The various illustrative logical blocks, modules, proces-sors, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware compo-nents, or any combination thereof designed to perform the functions described herein. A processor may be a micropro-cessor, but in the alternative, the processor may be any conventional processor, controller, microcontroller, or state machine. A processor may also be implemented as a com-bination of computing devices, e.g., a combination of a DSP and a microprocessor, a plurality of microprocessors, one or more microprocessors in conjunction with a DSP core, or any other such configuration.

The aspects disclosed herein may be embodied in hard-ware and in instructions that are stored in hardware, and may reside, for example, in Random Access Memory (RAM), flash memory, Read Only Memory (ROM), Electrically Programmable ROM (EPROM), Electrically Erasable Pro-grammable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

In some embodiments, the computers may be on a dis-tributed computing network, such as one having any number of clients and/or servers. Each client may run software for implementing client-side portions of the embodiments. In addition, any number of servers may be provided for han-dling requests received from one or more clients. Clients and servers may communicate with one another via one or more electronic networks, which may be in various embodiments such as the Internet, a wide area network, a mobile telephone network, a wireless network (e.g., Wi-Fi, 5G, and so forth), or a local area network. Networks may be implemented using any known network protocols.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

It is also noted that the operational steps described in any of the exemplary aspects herein are described to provide examples and discussion. The operations described may be performed innumerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for disaster roaming comprising:
initiating a disaster roaming search by user equipment (UE) if, after performing determinations of each of the following conditions, one of the conditions occurs:
    the UE receives a System Information Block (SIB) from a first Public Land Mobile Network (PLMN), the SIB comprising at least one disaster roaming information element;
    the UE receives a message and/or an information element from the first PLMN indicating an occurrence of a disaster or availability of disaster roaming; and
    the UE determines out-of-service (OOS) from the first PLMN, wherein the OOS condition comprises loss of core-network connectivity while a radio link with a base station of the first PLMN remains operational;
searching by the UE for a second PLMN to register.

2. The method of claim 1, wherein the at least one disaster roaming information element comprises setting ApplicableDisasterInfo-r17 of the first PLMN to commonPLMNs-r17 or dedicatePLMNs-r17.

3. The method of claim 1, wherein the messages comprises a common message, a dedicated message or a broadcast message.

4. The method of claim 1, wherein the message and/or the information element is sent from Earthquake and Tsunami Warning System (ETWS) or Commercial Mobile Alert Service (CMAS).

5. The method of claim 1 further comprising registering to the second PLMN when the UE is on a disaster roaming target cell of the second PLMN.

6. The method of claim 5 further comprising camping on the disaster roaming target cell by the UE.

7. A method of for disaster roaming comprising:
adjusting a cell selection criterion of user equipment (UE) when the UE is on a disaster roaming target cell of a Public Land Mobile Network (PLMN); and
assigning a camp threshold in the cell selection criterion.

8. The method of claim 7, wherein the cell selection criterion is adjusted to satisfy:

$$(Srxlev>0 \&\& Squal>0) \| (Q_{rxlevmeas} \geq \text{camp threshold})$$

wherein:
    Srxlev is cell selection RX level value;
    Squal is cell quality value; and
    $Q_{rxlevmeas}$ is measured cell RX level value.

9. The method of claim 8, wherein:

$$Srxlev = Q_{rxlevmeas} - (Q_{rxlevmin} + Q_{rxlevminoffset}) - P_{compensation} - Q\text{offset}_{temp}$$

$$Squal = Q_{qualmeas} - (Q_{qualmin} + Q_{qualminoffset}) - Q\text{offset\_temp}$$

wherein:
    $Q_{rxlevmin}$ is a minimum required RX level in the cell;
    $Q_{rxlevminoffset}$ is an offset to the signaled $Q_{rxlevmin}$ taken into account in a Srxlev evaluation as a result of a periodic search for a higher priority PLMN while camped normally in a Visited Public Land Mobile Network (VPLMN);
    $P_{compensation}$ is a compensation value;
    $Q\text{offset}_{temp}$ is an offset temporarily applied to the cell;
    $Q_{qualmeas}$ is measured cell quality value;
    $Q_{qualmin}$ is a minimum required quality level in the cell; and
    $Q_{qualminoffset}$ is an offset to the signaled $Q_{qualmin}$ taken into account in a Squal evaluation as a result of a periodic search for a higher priority PLMN while camped normally in the VPLMN.

10. The method of claim 9, wherein the disaster camp threshold is assigned according to a following expression:

$$\text{camp threshold} > (Q_{rxlevmin} + Q_{rxlevminoffset}) + P_{compensation} + Q\text{offset}_{temp}.$$

11. User equipment (UE) comprising:
an antenna; and
a processor coupled to the antenna, configured to:
    initiate a disaster roaming search if, after performing determinations of each of the following conditions, one of the conditions occurs:
        the UE receives a System Information Block (SIB) from a first Public Land Mobile Network (PLMN), the SIB comprising a disaster roaming information element;
        the UE receives a message and/or an information element from the first PLMN indicating an occurrence of a disaster or availability of disaster roaming; and
        the UE determines out-of-service (OOS) from the first PLMN, wherein the OOS condition comprises loss of core-network connectivity while a radio link with a base station of the first PLMN remains operational; and search for a second PLMN to register.

12. The user equipment of claim 11, wherein the disaster roaming information element comprises ApplicableDisasterInfo-r17 of the first PLMN setting to commonPLMNs-r17 or dedicatePLMNs-r17.

13. The user equipment of claim 11, wherein the messages comprises a common message, a dedicated message or a broadcast message.

14. The user equipment of claim 11, wherein the message and/or the information element is sent from Earthquake and Tsunami Warning System (ETWS) or Commercial Mobile Alert Service (CMAS).

15. The user equipment of claim 11, wherein the processor is further configured to cause the UE to the second PLMN when the UE is on a disaster roaming target cell of the second PLMN.

16. The user equipment of claim 15, wherein the processor is further configured to cause the UE to camp on the disaster roaming target cell.

17. User equipment (UE) comprising:

an antenna; and a processor coupled to the antenna, configured to:

adjust a cell selection criterion of UE when the UE is on a disaster roaming target cell of a Public Land Mobile Network (PLMN); and assign a camp threshold in the cell selection criterion.

18. The user equipment of claim 17, wherein the cell selection criterion is adjusted to satisfy:

$$(Srxlev>0 \&\& Squal>0) \| (Q_{rxlevmeas} \geq camp\ threshold)$$

wherein:

Srxlev is cell selection RX level value;

Squal is cell quality value; and $Q_{rxlevmeas}$ is measured cell RX level value.

19. The user equipment of claim 18, wherein:

$$Srxlev = Q_{rxlevmeas} - (Q_{rxlevmin} + Q_{rxlevminoffset}) - P_{compensation} - Qoffset_{temp}$$

$$Squal = Q_{qualmeas} - (Q_{qualmin} + Q_{qualminoffset}) - Qoffset\_temp$$

wherein:

$Q_{rxlevmin}$ is a minimum required RX level in the cell;

$Q_{rxlevminoffset}$ is an offset to the signaled $Q_{rxlevmin}$ taken into account in a Srxlev evaluation as a result of a periodic search for a higher priority PLMN while camped normally in a Visited Public Land Mobile Network (VPLMN);

$P_{compensation}$ is a compensation value;

$Qoffset_{temp}$ is an offset temporarily applied to the cell;

$Q_{qualmeas}$ is measured cell quality value;

$Q_{qualmin}$ is the minimum required quality level in the cell; and $Q_{qualminoffset}$ is an offset to the signaled $Q_{qualmin}$ taken into account in a Squal evaluation as a result of a periodic search for a higher priority PLMN while camped normally in the VPLMN.

20. The user equipment of claim 19, wherein the disaster camp threshold is assigned according to a following expression:

$$camp\ threshold > (Q_{rxlevmin} + Q_{rxlevminoffset}) + P_{compensation} + Qoffset_{temp}.$$

* * * * *